INVENTOR
E. G. Klein
BY
Richards & Geier
ATTORNEYS

United States Patent

[11] 3,523,485

[72] Inventor Ernst Gerhard Klein
 1 Walter-Flex Strasse, 59 Siegen,
 Westphalia, Germany
[21] Appl. No. 712,668
[22] Filed March 13, 1968
[45] Patented Aug. 11, 1970
[32] Priority March 18, 1967
[33] Germany
[31] No. W43592

[54] MACHINE TOOL WITH A MOVABLE PORTAL
 2 Claims, 3 Drawing Figs.
[52] U.S. Cl. ..................................... 90/15, 90/11
[51] Int. Cl. ..................................... B23c 1/02, B23c 1/06
[50] Field of Search .......................... 90/15, 13, 20.5, 11, 164

[56] References Cited
UNITED STATES PATENTS
1,937,408 11/1933 Johnson ..................... 90/15X
1,942,414 1/1934 Dumser et at ............... 90/15
2,895,386 7/1959 Mann .......................... 90/13

FOREIGN PATENTS
753,620 7/1956 Great Britain.

Primary Examiner— Gil Weidenfeld
Attorney—Richards and Geier

ABSTRACT: A milling machine has a movable portal which includes a double post and a single post. The double post may consist of a strut support having an inclined outer surface and firmly connected to a substantially narrow rectangular post, or it may consist of a single elongated member of uniform cross section. A yoke interconnects the two posts. The posts have base plates carried upon two elongated bed guides for the movement of the portal. A clip plate is located between the two bed guides while an additional clip plate is located to one side of a bed guide. A movable tool-carrying support is located close to the additional clip plate. An elongated spindle may extend across the two clip plates.

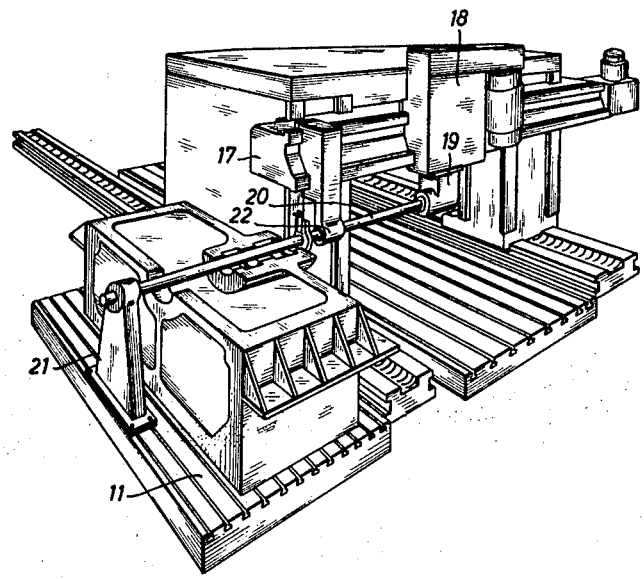

MACHINE TOOL WITH A MOVABLE PORTAL

This invention relates to a machine tool and refers more particularly to a milling machine having a movable portal. This portal is supported upon two bed guides by means of two base surfaces which are substantially equal to each other and which are located at the lower ends of substantially similar posts. The bed guides are located on two sides of a clip plate receiving the workpiece.

Milling machines of this type, as compared to the usual milling machines with a fixed portal and a reciprocating table upon which the workpiece is fixed, have the advantage that their length is smaller, since in machines with a movable table the length of the bed must be greater than double the length of the table, and the table must be longer than the length of the longest workpiece. Furthermore, the movement of the table produces inaccuracies in the movement of the workpiece which increase with an increase in weight of the workpiece, particularly since the weight load upon the table makes unavoidable changes in shape of the table, the bed and the intermediate parts. These changes can be greatly diminished if the workpiece is fixed directly upon a clip plate which is connected with the foundation, particularly since then the form changes can be balanced by aligning the workpiece.

On the other hand, milling machines with a movable portal have the drawback that the depth of the posts in the direction of movement is limited, since otherwise the workpiece can not be properly supervised and treated due to the deep and thus tunnel-like shape of the portal. When the cross section of the posts is determined in the usual manner, the guiding is not sufficiently precise during the movement of the portal when the two posts are moved as usual upon their guides by synchronously operating drives. These conditions are increased when the two posts are made as separate pieces and are joined at their upper ends by a yoke, since, obviously, this connection is not rigid enough to comply with the required high precisions at high cutting speeds and great strains. Heretofore, in order to provide a clean surface, it was therefore necessary to limit the feed speeds and the extent of the strains, particularly when the cross beam had to be moved to its high position for treating a high located surface of a workpiece, since then the operating forces engage the lever arm opposite the base surfaces of the posts.

An object of the present invention is to eliminate these drawbacks.

Another object is to provide a construction wherein the portal of the described machine tools is made more rigid than in prior art constructions, while retaining the advantages of corresponding machines having a movable table.

Other objects of the present invention will become apparent in the course of the following specification.

In the accomplishment of the objectives of the present invention it was found desirable to provide a support sliding upon one of the two bed guides and connected strut-like with a post to constitute a double post, whereby the support slides upon the same bed guide. This support is provided with a third base plate which complements the two base plates of the posts to form a rectangular triangle. As a rule, the assumption is that the cross beam extends horizontally and perpendicularly to the direction of movement of the portal, although the present invention provides the possibility to deviate from this construction if such deviation provides advantages which will be described in detail hereinafter.

The strut support constituting the subject of the present invention greatly increases the rigidity of the portal without affecting the ease of inspecting the workpiece, since the strut support is connected solely to one of the two portal posts. Furthermore, the strut can be so constructed that a triangular recess remains in the triangle extending between the strut support and the perpendicular posts, which facilitates not only the inspection but if necessary also the handling of the workpiece between the strut support and the post. The strut support can be connected with its post in any suitable secure manner, for example, by screws and by the provision of special braces, such as horizontally extending brace carriers located closely above the base plates. This arrangement makes it also possible to attach the supports of the present invention to existing machine tools with portals and to increase correspondingly the output of such machines.

It was found particularly advantageous to arrange the centers of the three base plates of the portal of the present invention in such manner that they form a rectangular triangle with acute angle of 30° at the single post and 60° at the double post since this provides good supervision facilities along with good rigidity of the portal and a good longitudinal guiding. Other advantages are also present which will be also described in detail hereinafter.

To further increase the rigidity, it is advisable to join the parts of the double post to constitute a single piece; this does not prevent the provision of recesses for better inspection of the workpiece from the side of the double post as well, although the construction of the double post as a single piece provides the greatest rigidity and at the same time makes possible without the necessity of special arrangements to provide a single base surface extending over the entire support range. This improves the safety of longitudinal movement and diminishes the wear of the guides of the base.

Furthermore, the construction of the post of the present invention as a double post makes it possible to construct its guides as the only longitudinal guides for the entire portal. This eliminates the drawback of prior art constructions wherein both posts had to be provided with longitudinal guides, so that tensions in the posts within the yoke and in the foundation could not be avoided at higher temperatures. Such variations must be accepted since the temperatures of the foundation remain comparatively the same while those of the yoke vary to a substantial extent, particularly if the sun shines in.

When the construction of the entire guide length is the usual one with two side guiding surfaces and a drive located in between, for example, a rack with a pinion or a spindle with a screw, the longitudinal guide for a double post can be so constructed that either only one of the two guide surfaces, namely, either the inner one or the outer one, will be used for guiding purposes, or the guiding can take place by the two inner edges of the guide surfaces, or by their two outer edges. Finally, it is possible to construct all four edges of the two guide surfaces as guides; in that case, however, the two opposed edges, namely, either the inner edges or the outer edges, are used for guiding purposes and the change-over takes place depending upon the wear condition of the surfaces. In any event, the use of the present invention makes it possible to eliminate a longitudinal guide for a single post, so that it will receive solely vertical forces, while expansion caused by temperature changes or changes in shape can be easily absorbed by its base surface. The drive of this single post must be arranged accordingly.

To avoid an overturning of the portal, particularly due to the absence of a longitudinal guide for the single post, the point of application of the driving force must be placed as closely as possible to the frictional center of gravity of the portal. This is impossible, however, for practical reasons, namely, since this frictional center of gravity would be located within the range of the clip plate. In accordance with the present invention, this difficulty is avoided by causing the drive for the single post to be applied to the frictional center of gravity of its base, while retaining a drive for the double post and the single post. Since this can also cause complications, it is advisable to provide two drives for the single post, which are located close to the edges of the base and which can engage from the outside the two guiding edges; then the frictional gravity center will be always safely located between these two drives of the single post.

By providing adequate rigidity for the portal, the present invention creates the possibility, which did not exist heretofore, for its application to other milling machines, for example, to grinders, but especially to measuring machines which instead of milling supports are provided with measuring units for measuring larger workpieces by means of mechanical, optical, ultrasonic or laser measuring devices. A movement of the portal which is free from swinging, is of utmost importance for such measuring machines, and this is provided by the present invention.

In accordance with a different embodiment of the present invention, an additional clip plate can be provided close to the bed guide for the double post, so that a workpiece can be fixed thereon, whereby the machining can be carried out by a milling or boring support.

When this support is provided with the usual angle piece or when a support is used which has an upper support swingable relatively to the lower support about a horizontal axis extending in the direction of travel of the portal, the construction of the present invention can be used as a driller with a horizontal working spindle and with the movement of the support in the direction of the feed toward the cross beam. For further uses, a bracket of known construction or an auxiliary post can be provided at the outer edge of the additional clip plate in which the free end of the spindle is mounted. If a bearing guide for the spindle is provided upon the corresponding end of the cross beam, a long spindle can be used which operates very reliably, namely, substantially without swinging, and which can cover the entire range of a comparatively wide clip plate by the movement of the support to the cross beam.

The main object, namely, that of increasing the rigidity of the portal, can be solved still better when the double post has substantially the same cross section throughout its height and the corresponding yoke has the general shape of a triangular plate. By the use of the inclined strut which engages a post from the rear and makes it a double post only this post and indirectly the longitudinal guiding are improved. On the other hand, by the use of a double post having the same cross section throughout its height and having a triangular plate, the entire system is enlarged to form a prism which has a substantially greater rigidity. Furthermore, this construction provides the possibility to arrange a guide for further supports upon the rear side of the double post, for example, for a side support used to machine vertical surfaces of a workpiece located upon the clip plate or upon the additional clip plate.

The rigidity of the yoke plate can be improved if it is extended deeply downwardly between the posts out of the range of the cross beam. In this case also the greatest amount of rigidity can be attained when the cross beam is provided with a box-like rearward extension between the posts, while keeping the then necessary recesses in the yoke plate so small that its rigidity effect is not substantially affected. To save weight the yoke plate can be then constructed as a box in a known manner and preferably provided with recesses.

The above described construction of double posts with a vertical rearwardly extending guiding surface makes it possible to provide a rearwardly extending guiding surface for single posts as well and to provide upon their rear sides an additional cross beam which extends at an acute angle (in top view) to the actual cross beam and which can be used to receive further supports. This arrangement provides the possibility which did not exist heretofore, to provide a row of supports with spur gear cutters for treating workpieces with a large upper horizontal surface, for example for slab blooms, the axes of the supports lying in a vertical plane parallel to the rear plane of the portal, the spaces between the axes being such that the treating ranges of the cutters overlap each other, whereby two adjacent cutters should have opposite directions of rotation. Only the inclined arrangement of the cross beam makes possible the staggered and overlapping arrangement of the cutters so that even the largest surfaces can be treated in a single operation. Furthermore, by causing adjacent cutters to rotate in opposite directions, the cutters always operate properly in interengagement without being hindered by the removal of shavings and without being dirtied.

This arrangement makes it possible to greatly increase the output, particularly if the diameter of the cutter heads is made smaller than heretofore, so that with the same torques larger pressure outputs can be attained. The rigidity of the system can be increased if this group of cutters is combined in a common cutter support. However, the cutters can be also directly rigged or screwed upon the rear cross beam, since they do not have to be moved any more after having been initially set. Furthermore, the cross beam can be eliminated entirely, while the yoke plate is provided with a guide upon which the cutters are guided, set or screwed, whereby the height setting can be carried out in a known manner by the axial adjustment of the cutter spindle.

Finally, it should be pointed out that when there are particularly high demands upon the rigidity of the portal, an auxiliary support may be provided for the single post as well, according to the present invention; this auxiliary support may have the same construction as the one previously described, but should preferably consist of a removable inclined prop, so as not to eliminate the advantages of good accessibility of the workpiece and its unhindered observation.

The invention will appear more clearly from the following detailed description when taken in connection with the accompanying drawings showing by way of example only, preferred embodiments of the inventive idea.

In the drawings.

The same parts are indicated by the same numerals in the drawings.

Figure 1:
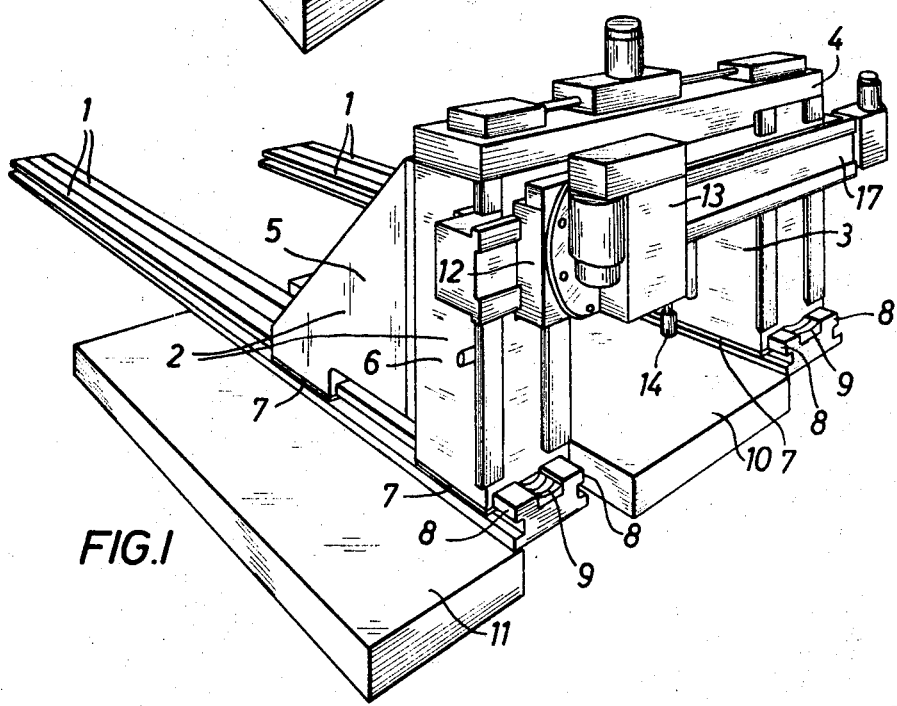
FIGURE 1 is a perspective view of a machine of the present invention having an inclined support, a swingable cutter head and an additional clip plate.

The apparatus shown in FIG. 1 has a portal which is slidable upon two bed guides 1 and which consists substantially of a double post 2, a single post 3 and a yoke 4. The double post 2 consists of a combination of a strut support 5 and a post 6. The entire portal is supported upon the guides 1 by three base plates 7 which are carried by the members 5, 6 and 3 and which enclose a rectangular triangle with acute angles of 30° at the single post and 60° at the double post. Opposed side edges 8 of the bed guide of the double post 2 are shaped as longitudinal guides for the posts. The drives 9 of the double post 2 and of the single post 3 are located between the two corresponding side surfaces 8.

In addition to the clip plate 10 located between the bed guides 1, the portal milling machine has an additional clip plate 11 located adjacent to the bed guide of the double post 2. Workpieces fixed upon the plate 11 are treated by a working spindle 14 mounted upon an upper support 13 which is swingable about a horizontal axis extending in the direction of movement of the portal.

The operation of this machine is apparent from the above description.

Figure 2:
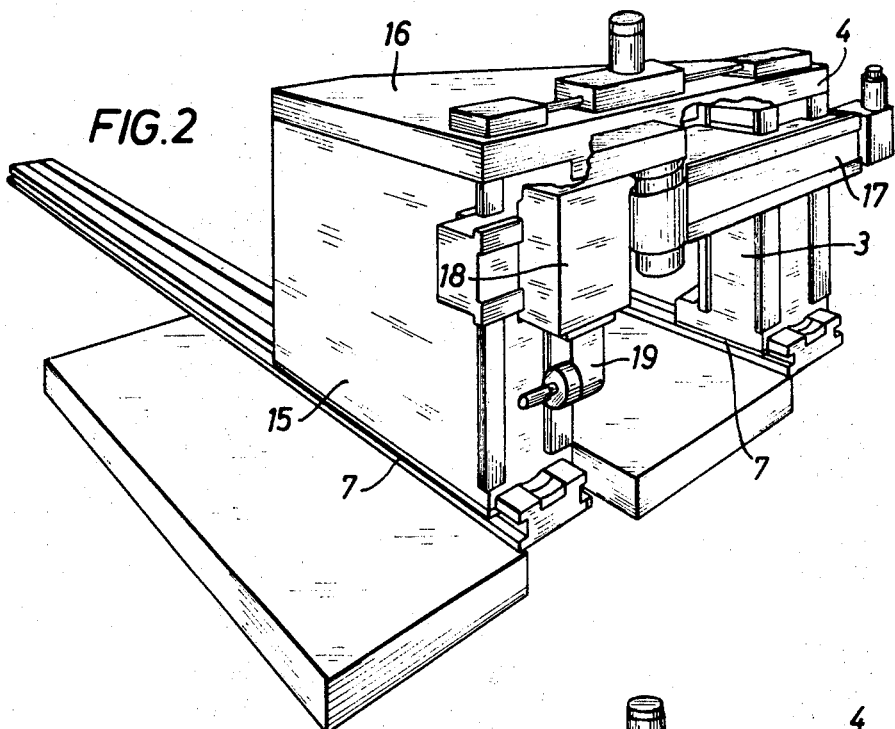
FIGURE 2 is a perspective view of another embodiment with a double post having substantially the same cross section throughout its height and provided with a corresponding triangular yoke plate, an angular cutter head and additional yoke plates.

FIG. 2 shows a somewhat different construction having an elongated double post 15 the cross section of which remains the same throughout its height. The double post 15 is connected with the single post 3 by a triangular yoke 16. The base plate of the double post extends along the entire length thereof. As in the construction of FIG. 1, the construction shown in FIG. 2 has a support 18 for milling or boring which is movable upon a cross beam 17. However, in the construction of FIG. 2 the support 18 has an angular tool-carrying extension 19.

In other respects the construction and operation of this machine are the same as those of the one previously described.

Figure 3:
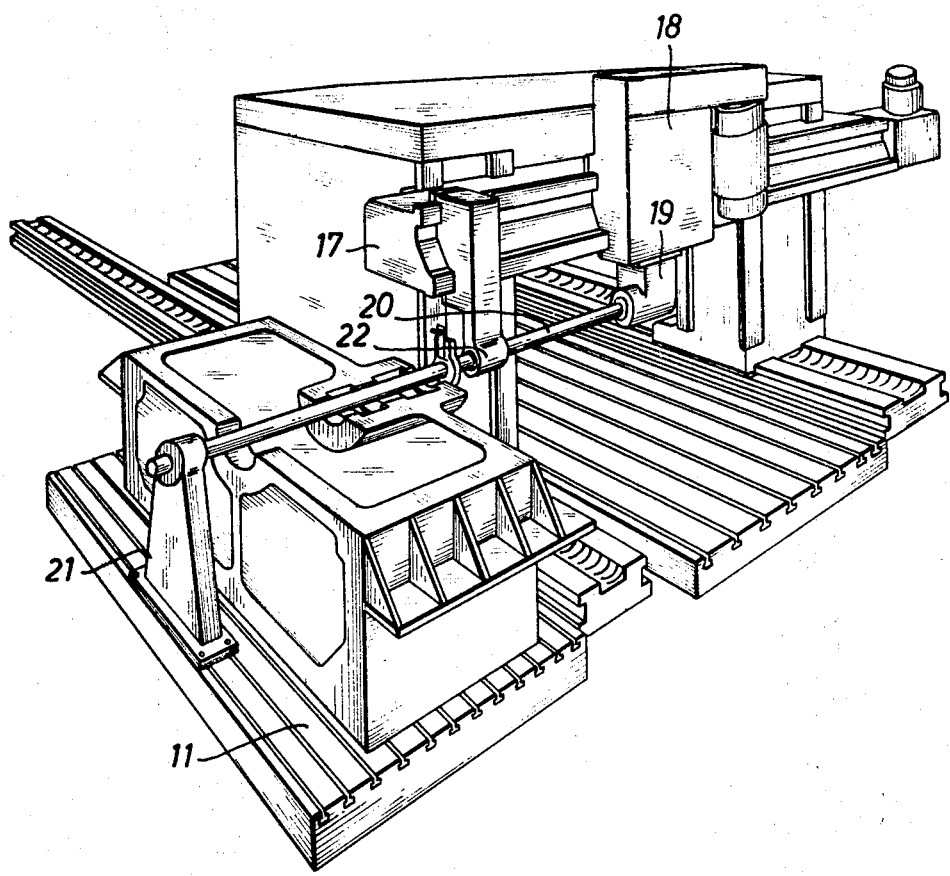
FIGURE 3 is a perspective view of yet another embodiment with an auxiliary support at the outer edge of the additional plate and a corresponding spindle guide.

The machine shown in FIG. 3 has, in addition to the embodiment of FIG. 2, a horizontally extending working spindle 20 which is supported at one end by the angular extension 19' of the support 18', and at the other end by a bearing stand 21 located at the outer edge of the additional clip plate 11'. In-between, namely, at the end of the cross beam 17' which is directed toward the clip plate 11', the spindle 20 is supported by a bearing 22. In other respects the construction is the same.

It is apparent that the examples described above have been given solely by way of illustration and not by way of limitation and that they are capable of many variations and modifications within the scope of the present invention.

I Claim:

1. A milling machine having a movable portal comprising a double post, a single post, a yoke interconnecting said posts, base plates carried by said posts, a clip plate located between said posts, two bed guides located on opposite sides of said clip plate and supporting said base plates for the moving of the portal, said double post consisting of a single elongated member of uniform cross-sectional height, the base plate carried by the double post extending along the entire length thereof, a triangular yoke carried by said double post, an additional clip plate extending along the bed guide for the double post, a bearing stand located at the outer edge of said additional clip plate, a cross beam carried by the portal and having an end located adjacent said additional clip plate, a bearing connected with said cross beam and a spindle carried by said bearing stand and said bearing.

2. A machine in accordance with Claim 1, comprising a guide carried by a surface of the double post for one or more supports for treating vertical side surfaces of a workpiece.